April 9, 1963　　　A. L. HENDON　　　3,084,753
WEIGHING APPARATUS
Filed Jan. 18, 1960　　　2 Sheets-Sheet 2
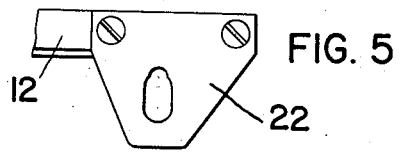
FIG. 5
FIG. 3
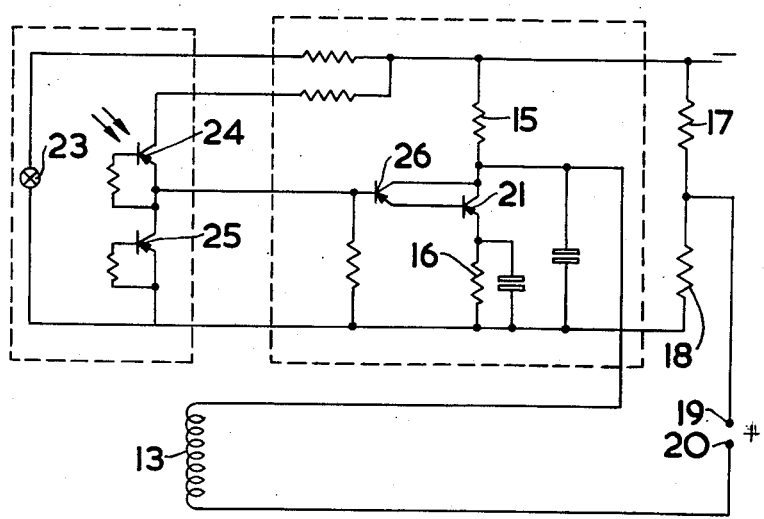
FIG. 4
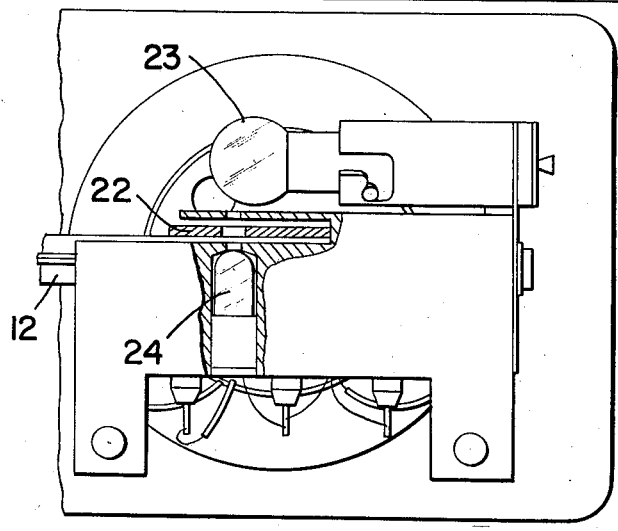
INVENTOR
ANTHONY LEONARD HENDON
ATTORNEYS

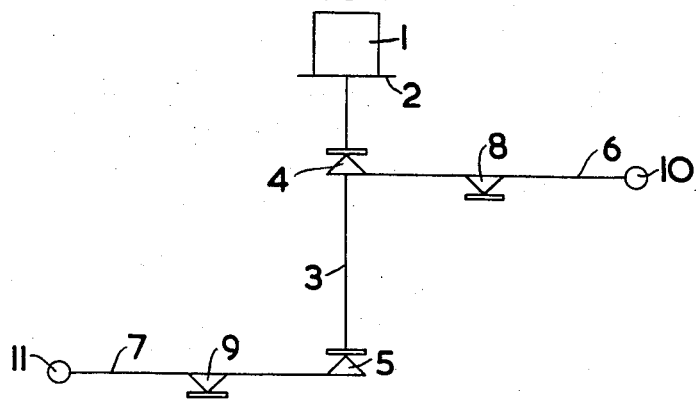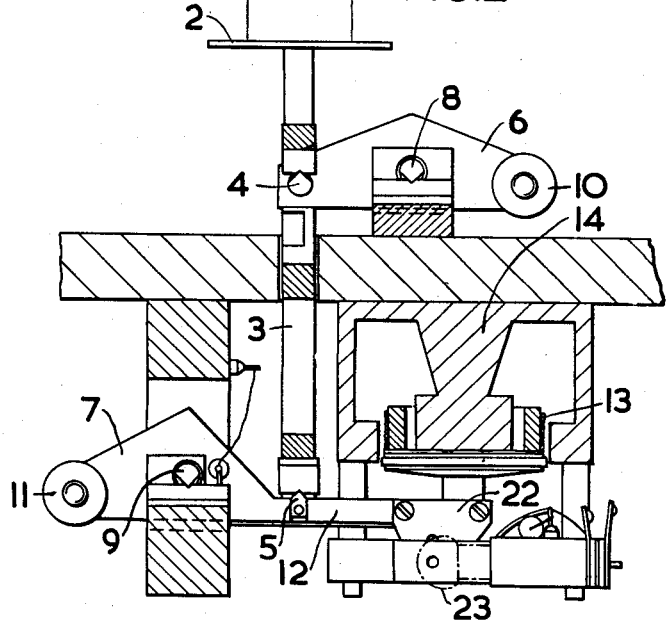

United States Patent Office 3,084,753
Patented Apr. 9, 1963

3,084,753
WEIGHING APPARATUS
Anthony Leonard Hendon, West Horsley, England, assignor to Telomex Limited, Horsham, England
Filed Jan. 18, 1960, Ser. No. 2,943
Claims priority, application Great Britain Jan. 20, 1959
5 Claims. (Cl. 177—210)

This invention relates to weighing apparatus particularly for weighing at high speed.

In a conventional weighing apparatus the balanced beam is insensitive to vertical vibration components, since the vertical acceleration acts equally on the object being weighed and the counterweight. On the other hand a rotational vibration force or couple applied to the system of a conventional weighing apparatus will cause the beam to respond because of its inertia and produce an error in weighing.

According to the invention in its broadest aspect there is provided a weighing machine comprising a pair of weighing beams on opposite sides of a single vertical member and both connected to this member, the arrangement being such that any unwanted rotational forces applied to the two beams are absorbed in the connecting member without causing its displacement.

In accordance with a preferred form of the invention there is provided a weighing machine comprising a pair of weighing beams on opposite sides of a single vertical member and both connected to this member, the object to be weighed being carried by the vertical member and the counterweight being carried in divided form by the two beams, the arrangement being such that unwanted rotational forces applied to the two beams are absorbed in the connecting member without causing its displacement.

An embodiment of the invention in its preferred form will now be described by way of example with reference to the accompanying drawings, of which:

FIG. 1 is a schematic diagram of the principle of operation,

FIG. 2 is a sectional elevation of the weighing machine,

FIG. 3 is a diagram of the associated electric circuit,

FIG. 4 is a fragmentary view showing the shutter, and

FIG. 5 is a plan view partially broken away and in section showing the shutter between a light source and the photo-transistor of FIGURE 3.

Referring to the simple diagram of FIG. 1, the object 1 to be weighed is supported on a platform 2 at the head of a vertical member 3. The member 3 rests on knife edges 4 and 5 at one end of each of a pair of weighing beams 6 and 7. The latter are pivotally mounted on knife edges 8 and 9 and at their other ends carry partial counterweights 10 and 11 which together make up the counterweight necessary to balance a given weight of the object 1. As in previous weighing machines, vertical acceleration forces applied to the system will not result in a weighing error by virtue of the equal forces acting on the weight and counterweights. On the other hand, with the arrangement shown in FIG. 1, a rotational force applied to the frame of the machine will tend to produce rotational movement of both beams simultaneously in the same direction. The result will be to exert a variation in the compressive stress on the vertical member 3 due to the upward force of the counterweights. As a result the member 3 will remain stationary with respect to the frame so avoiding any error. In other words, the beams will remain parallel to a horizontal line through the frame under all conditions of external vibration.

Referring now to the practical construction shown in FIG. 2, it will be observed that like reference numerals have been used therein for the components diagrammatically shown in FIG. 1.

In accordance with a preferred embodiment of the invention, it is applied to an electrically operated force-balance weighing system utilising the circuit shown in FIG. 3 as well as the additional parts shown in FIG. 2 which will now be described.

Attached to an extension 12 of the lower beam 7 is a conductive coil 13 which is free to move within the field of a permanent magnet 14 (the latter could equally well be an electro-magnet). It will be apparent that with a given weight of the object 1 the equilibrium of the system can be maintained or disturbed by varying the value of the current in the coil 13. In practice this embodiment of the invention lends itself particularly to the check-weighing of articles whose weight must be not less than and not greater than a given amount. For this purpose, the values of the counterweights 10 and 11 and the character of the associated circuit of FIGURE 3 are so chosen as to produce zero coil current, when and only when the object 1 has this given weight. Thus in the case of an object having a weight which is greater or less than this amount, a current is caused to pass through the coil and the value and sense of the current deviation from the zero value will be a measure of the difference between the actual weight of the object and its ideal weight.

Referring to FIG. 3, the coil 13 is connected across a bridge circuit comprising resistors 15, 16, 17 and 18, the terminals 19 and 20 being connected to current-sensitive apparatus (not shown) for detecting and indicating weight deviations and/or initiating appropriate action such as the differential rejection of overweight or underweight objects. The arm of the bridge which includes the resistor 16 also includes a transistor amplifier 21 responsive to a light-sensitive follow-up system now to be described.

Attached to the extension 12 of the lower beam 7 (FIG. 2) is an apertured shutter 22 interposed between a lamp 23 and a photo-transistor 24. A non-light-receiving photo-transistor 25 is connected in series with the photo-transistor 24 to serve for temperature compensation. The form of the aperture in the shutter 22 is such that variations in the position of the shutter 22 due to movement of the beam 7 result in variations in the output of the photo-transistor 24 which output is amplified in a two stage amplifier comprising a transistor 26 and the transistor 21 already referred to. These variations unbalance the bridge circuit and cause a positive or negative current to flow through the coil 13 tending to restore the beam balance. The current flowing in the coil when equilibrium is achieved is then a measure of the weight with respect to the counter-weights 10 and 11.

It is to be understood that other light-sensitive devices could equally be used in place of the photo-transistors 24 and 25 and thermionic valves in place of the transistors 21 and 26.

I claim:

1. In a weighing machine, a vertically movable member having means at its upper end for applying an object to be weighed, two straight parallel generally horizontal weigh beams extending in opposite directions from said vertical member and pivoted intermediate their ends upon relatively fixed axes, means operably connecting the adjacent ends of said beams to said vertical member at vertically spaced points so that unwanted rotational forces applied to said machine tending to rock said beams in the same direction about their respective pivots will be oppositely transferred in balanced relation to said member whereby said forces do not displace said member, and counterweights at the other ends of said weigh beams.

2. In the weighing machine defined in claim 1, electrical sensing means operably connected to one of said weigh beams and an associated circuit connected to said device of such nature as to be balanced when a predetermined weight is on said vertical member and unbalanced when said weight is above or below a predetermined value.

3. In the weighing machine defined in claim 1, an associated electrical circuit containing a photosensitive element, a light source for energizing said element, a shutter mounted on one of said weigh beams and disposed in the light path between the light source and element, and electromagnetic means in said circuit connected to said one weigh beam and operative in response to modulation of said light to control movement of said one weigh beam.

4. In the weighing machine defined in claim 1, electromagnetic means comprising relatively movable coil and magnet members one of which is mounted on one of said weigh beams, an associated control circuit containing said coil and of such characteristics that there is zero current flow in the coil when the weight on said vertical member is within certain limits, and follow-up means in said circuit responsive to movement of said one weigh beam for inducing current flow in said coil when said weight is not within said limits.

5. In the weighing machine defined in claim 4, said follow-up means comprising a light sensitive unit in said circuit and a light modulating shutter therefore mounted on said one weigh beam.

References Cited in the file of this patent

UNITED STATES PATENTS

| | | |
|---|---|---|
| 178,358 | Carpenter | June 6, 1876 |
| 1,198,757 | Osgood | Sept. 19, 1916 |
| 2,597,831 | Willis | May 10, 1952 |
| 2,602,660 | Shannon | July 8, 1952 |
| 2,734,735 | Payne | Feb. 14, 1956 |
| 2,734,736 | Payne | Feb. 14, 1956 |
| 2,754,109 | Eyraud et al. | July 10, 1956 |
| 2,940,747 | Eder et al. | June 14, 1960 |

FOREIGN PATENTS

| | | |
|---|---|---|
| 18,391 | Great Britain | Aug. 21, 1902 |